April 1, 1958
P. LIPPKE
2,829,340
ARRANGEMENT FOR MEASURING THE HUMIDITY OF
MOVING WEBS OF MATERIAL
Filed May 6, 1953
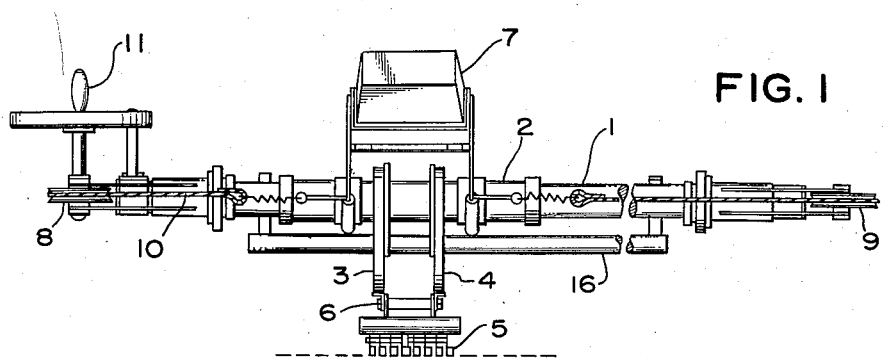
FIG. 1
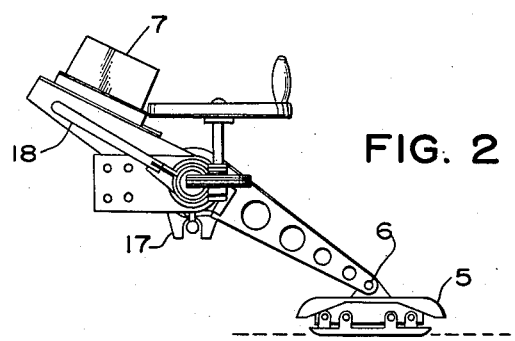
FIG. 2
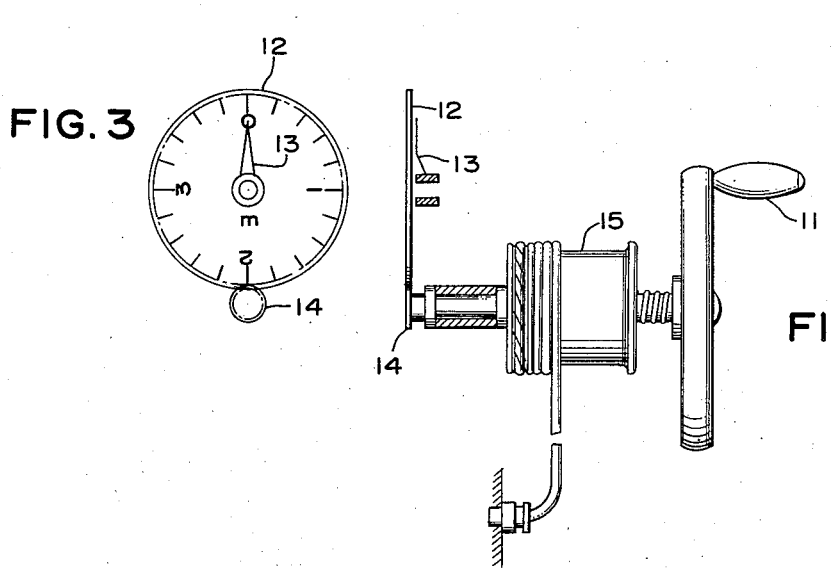
FIG. 3
FIG. 4
INVENTOR
PAUL LIPPKE
BY Burgess, Dinklage & Sprung
ATTORNEYS

2,829,340
ARRANGEMENT FOR MEASURING THE HUMIDITY OF MOVING WEBS OF MATERIAL

Paul Lippke, Neuwied (Rhine), Germany

Application May 6, 1953, Serial No. 353,320

Claims priority, application Germany May 17, 1952

7 Claims. (Cl. 324—61)

In various industries, as for example in the manufacture of paper, cardboard, cellulose, textiles, and similar materials, it is of importance to be able at any time to ascertain the degree of moisture or humidity which may still be contained in previously dried webs of such materials. Hygrometers of various kinds have already been used for this purpose, but none of them has yet been able to satisfy all practical requirements.

It is, therefore, the main object of the invention to provide an improved hygrometer, in which the deficiencies of the devices at present in use are eliminated and which, further, will be capable of a wider range of use than has been possible heretofore. In the manufacture of the materials above referred to, and others, it is of importance for example to not only test the humidity of the web at only one place thereof, but to ascertain the degree of moisture also at other places, and it is particularly important to know the distribution of the moisture or humidity of the material at right angles to the traveling direction of the web or, in other words, throughout the width of the web. Up to the present this has not been possible and it is, therefore, one of the features of the invention to accomplish this object and to thereby provide a hygrometer arrangement which will be capable of testing the whole width of the web while moving.

Another object of the invention consists in the provision of a device of the aforesaid type, in which the feelers which are used for testing the humidity of the moving web are displaceable in a direction crossways to the direction of travel of the web and movable thereover either by hand or by mechanical, electrical, or other means.

A further object of the invention is the provision of a device of the kind referred to, in which the feeler is capable of a certain amount of universal movement in order to be able to compensate for alterations in the position of the moving web while maintaining its working pressure thereon.

Other objects and improvements of the invention will be apparent from the accompanying sheet of drawings, in which a preferred embodiment of the invention is illustrated by way of example.

In these drawings:

Fig. 1 is a front elevation of the device,

Fig. 2 is a side elevation thereof.

Fig. 3 is a detail, showing part of the feeler shifting means.

Fig. 4 illustrates a device for ascertaining the position of the feeler on the web.

Slidable on the tubular main stay 1 is a tubular slide 2 having arms 3 and 4 adapted to carry the feeler 5. The feeler, in this case, is constituted by an electric condenser for dielectric measurements and it is pivotally mounted at 6 to the arms 3 and 4 which are movable with the tubular slide 2 as by means of the arms 3a and 4a. Also mounted on the slide 2 is a housing 7 in which further parts of the hygrometer may be contained, such for example as the high frequency leads which in connection with the measuring condenser, preferably a stray field condenser, serve to convert the determined moisture quantities into electric quantities. It is to be understood, that both the feeler and the housing may be such as might also be usable in connection with other measuring principles and devices as, likewise, the parts shown may be replaced by other parts serving the same purpose. The paper or other material of which the contents of moisture are to be measured is indicated by the broken line 20 over which the feeler 5 is reciprocated by the following device:

The main stay 1 carries at its ends brackets 21 in which are journaled rollers 8 and 9 over which a cord 10 is passed. The ends of this cord 10 are fastened to pins 22 on the tubular slide 2 with springs 23 being interposed at either end. Movement of the tubular slide 2 to the right or left is imparted to it by a crank 11 on the pulley or roller 8 through the cord just referred to.

In connection with the crank drive is an indicator as shown in Fig. 3, which comprises a dial 12, a pointer 13, and a driving wheel 14. This indicator is such as will indicate the position which the feeler 5 takes at its various places intermediate the edges of the web, which, in the drawing, is indicated by broken lines 20. In the indicator the pointer 13 is shown to be stationary, while the dial is circumferentially provided with teeth by means of which it can be rotated by the crank drive 11 and the gear wheel 14.

If desired and in order to obtain a most accurate coincidence between the feeler and the scale of the indicator 12, the cord 10 may be replaced by a chain or, preferably, by a perforated metal band.

Connection between the movable feeler of the measuring device and the stationary parts of the latter may be established by any convenient means, such for example, as a flexible electric conduit 24, a rubber hose, or the like. These conduits may be freely suspended with the feeler, or they may be wound up on a roller 15 which is in connection with the crank drive 11.

The aforesaid measuring device is to be positioned in the working machine at right angles to the edges of the moving web of the material with the feeler resting under slight pressure thereon. The housing 7 can be used as a counterweight. Owing to the tubular slide 2 being turnable to a certain extent on the likewise tubular main stay 1, and the feeler 5 being freely swiveling on its bolt 6, the latter can adapt itself reliably to any position which the moving web during its travel may take.

It is of importance that the hygrometer arrangement should not impede the function of the drying machine. When the web happens to tear, or when a new web is to be started, the measuring device or, at least, the feeler should not remain in its operative position but should be moved out of the path of the web. In the embodiment illustrated in the drawings a bar 16 is provided for this purpose underneath and parallel to the main stay 1, upon which two prongs or the like, 17, of the main stay 1 are adapted to rest. If the device is to be turned out of its operating position, it need only be turned in its bearings 25 by the hand lever 18, which rocks the bar 16 about shaft 1 as centre by the brackets 17, causing it to take under the arms 3 and 4 as shown in Fig. 2, so as to lift these arms together with the feeler 5 upwardly away from the paper 20.

It will be understood by those skilled in the art, that the invention, of which a preferred embodiment has just been described, enables a considerably better utilization of devices for measuring the humidity of moving webs of material, because it makes it possible to so influence the drying process, or to correct the condition of the web, that irregularities in the humidity widthwise of the web will be eliminated.

What I claim is:

1. A hygrometer arrangement for use on a web producing machine for measuring the moisture of moving webs of material, comprising, a moisture responsive feeler for contact with a moving web of material, a main stay of preferably tubular cross section arranged above and at substantially right angles to said web, bearings on said web producing machine outside the edges of said web for turnably supporting said main stay, a slide member on said main stay for supporting said feeler, means for reciprocating said slide member and feeler, a bar below and parallel to said main stay, prongs on said main stay for engagement with said bar, and a lever for swinging said main stay about said bar for thereby moving the feeler out of its operative position in the path of said web of material.

2. A hygrometer arrangement for use on a web producing machine for measuring the moisture contents of moving webs of material, comprising, a moisture responsive feeler for contact with said moving web of material, a main stay arranged above and at substantially right angles to said web, bearings on the machine outside the edges of said web for turnably supporting said main stay, a slide member movable on said main stay, a pair of inclined two-arm levers on said slide member, the lower arms thereof carrying said feeler and the upper arms carrying a housing for the accommodation of electric measuring instruments, means for reciprocating said slide and feeler widthwise of said web, and hand-actuated means for lifting said feeler out of the path of said web of material when a new web is to be inserted.

3. In a hygrometer arrangement for use on web producing machines for measuring the moisture contents of moving webs of material, a main stay journaled in brackets of said web producing machine above and at approximately right angles to said moving web of material, a tubular slide mounted for movement in axial direction on said main stay, means including a pulley at either end of said main stay and a cord passed over the said pulleys and fixed with its ends on the said tubular slide for moving the said slide along said main stay transversely over the said web of material, a hand crank for turning one of the said pulleys, a moisture responsive feeler, arms on said tubular slide for supporting said moisture responsive feeler movably over and in contact with said moving web of material, and means on the said main stay for tilting the said feeler out of contact with the said web of material when a new web is to be applied.

4. In a hygrometer arrangement for use on web producing machines for measuring the moisture contents of moving webs of material, a main stay journaled in brackets of said web producing machine above and at approximately right angles to said moving web of material, a tubular slide mounted for movement in axial direction on said main stay, means including a pulley at either end of said main stay and a cord passed over the said pulleys and fixed with both its ends on the said tubular slide for moving the said slide along the said main stay transversely over the said web of material, a spring interposed between said cord and slide at both ends thereof, a hand crank for turning one of the said pulleys, a moisture responsive feeler, arms on said tubular slide for supporting said moisture responsive feeler movably over and in contact with said web of material, an indicator marking the positions of said feeler over the said web of material arranged to be moved by the said slide moving means, and means on the said main stay for moving the said feeler out of contact with the said web of material when a new web is to be applied.

5. In a hygrometer arrangement for use on web producing machines for measuring the moisture contents of moving webs of material, a main stay of tubular cross section journaled in brackets of said web producing machine above and extending at approximately right angles to the moving direction of said web of material, a tubular slide arranged for movement over and along the said main stay, means including a pulley at either end of said main stay and a cord passing over the said pulleys, a spring at either end of the said slide to which the ends of the said cord are attached, a hand crank on one of the said pulleys for moving the said tubular slide by means of the cord axially along the said main stay, a moisture responsive feeler, comparatively short arms on said tubular slide extending obliquely downward to carry at their free ends the said moisture responsive feeler so as to be in contact with said moving web of material, comparatively short arms on the said tubular slide extending obliquely upward substantially in continuation of said downwardly extending arms, a housing to accommodate the measuring instruments at the free ends of said upwardly extending arms and serving as a counterweight to the said feeler, and a handle on the said main stay for tilting the said feeler upwardly out of contact with the said web of material when a new web is to be applied.

6. A hygrometer arrangement for use on moving webs of material, comprising, a moisture responsive feeler, a main stay arranged above and at right angles to the direction of travel of said web of material, bearings outside the edges of said web for turnably supporting said main stay, a slide member on said main stay capable of limited turning movement thereon, a pair of inclined two-arm levers on said slide extending one pair obliquely upward and the other obliquely downward, the downward extending arms carrying said moisture responsive feeler and the upward extending arms carrying a counterweight, means for reciprocating said slide transversely over the said web of material with said feeler in contact therewith, said means including a cord and pulley arrangement in connection with said main stay, a bar arranged parallel to and below the said main stay intermediate the said bearings, prongs on the main stay adapted to seat on said parallel bar, and a hand lever on said main stay for swinging said prongs and parallel bar about the axis of said main stay in order thereby to lift said feeler by contact with its supporting arms upwardly out of its operating position.

7. A hygrometer arrangement for measuring the moisture contents of moving webs of material as set forth in claim 3, in which a perforated steel band is used for reciprocating the feeler-carrying tubular slide along the main stay widthwise of the said web of material.

References Cited in the file of this patent

UNITED STATES PATENTS

| | | |
|---|---|---|
| 1,708,074 | Allen | Apr. 9, 1929 |
| 1,991,093 | Haverstick | Feb. 12, 1935 |
| 2,058,518 | Schuster | Oct. 27, 1936 |
| 2,197,823 | Young | Apr. 23, 1940 |
| 2,353,852 | Rowland et al. | July 18, 1944 |
| 2,373,200 | Simmons et al. | Apr. 10, 1945 |
| 2,659,048 | Zabel et al. | Nov. 10, 1953 |

FOREIGN PATENTS

| | | |
|---|---|---|
| 41,410 | Norway | June 2, 1925 |
| 495,994 | Germany | Aug. 25, 1926 |